Patented Nov. 13, 1923.

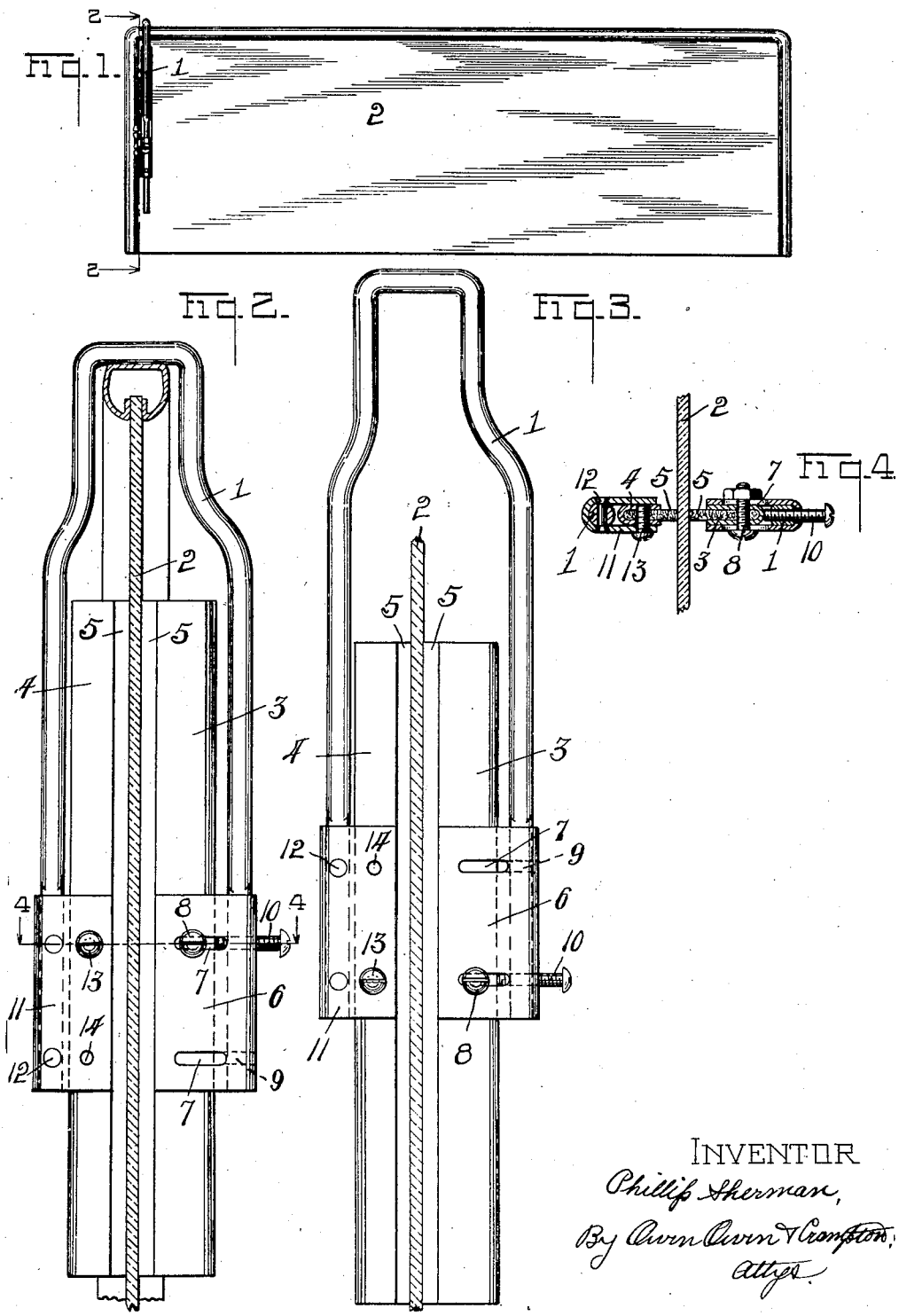

1,474,005

UNITED STATES PATENT OFFICE.

PHILLIP SHERMAN, OF TOLEDO, OHIO.

WINDSHIELD WIPER.

Application filed March 20, 1922. Serial No. 545,050.

*To all whom it may concern:*

Be it known that I, PHILLIP SHERMAN, a citizen of Poland, and a resident of Toledo, in the county of Lucas and State of Ohio, have made an Invention Appertaining to a Windshield Wiper; and I hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to windshield wipers for use particularly in connection with the windshields of automobiles, and has for its object the provision of a simple, efficient and inexpensive device of this character adapted to have sliding movements on a wind shield longitudinally thereof and to have its glass engaging or wiping strips easily and quickly adjusted both inward and outward with respect to the glass and longitudinally of the wiper as the conditions of use may require.

The invention is fully described in the following specification, and while, in its broader aspect, it is capable of embodiment in numerous forms, a preferred embodiment thereof is illustrated in the accompanying drawings, in which,—

Figure 1 is a front elevation of a windshield with a device embodying the invention mounted in operative position thereon. Fig. 2 is an enlarged fragmentary section on the line 2—2 in Fig. 1. Fig. 3 is a similar view thereof with a portion of the windshield broken away and with the wiper members at the limit of their outward adjustment relative to the holder or carrier frame, and Fig. 4 is a cross section on the line 4—4 in Fig. 2.

Referring to the drawings, 1 designates the holder or wiper member carrying frame of the device, which holder is of U-form to adapt it to straddle the upper portion of a wind shield 2 and to have reciprocatory movements lengthwise thereof.

One arm of the holder 1 carries a wiper member 3 and the other arm carries a wiper member 4 for wiping engagement with opposite sides of a windshield glass, each wiper member being of channel or U-form in cross section with its open edge disposed adjacent to the glass and receiving a wiping strip 5 of felt, rubber, steel or other suitable glass wiping or surface scraping material. The wiper member 3 is preferably disposed at the weather side of the windshield and is carried both for pivotal rocking and longitudinal adjusting movements by a U-shaped holder clip 6, which is mounted on the outer end portion of the respective holder arm with the arm seating in the loop portion thereof and with its open side projecting inward from the arm toward the glass and adapted to loosely receive the wiper member 3 therein.

The holder clip 6 is of elongated form lengthwise of its carrying arm and is provided through the side walls thereof with longitudinally spaced slots 7 which extend transversely thereof. The wiper member 3 carries a removable pivot bolt or pin 8 at its longitudinal center and this bolt is intended to project loosely through one or the other of the sets of slots 7, depending on the desired position of the wiper member with respect to the holder and windshield. It is evident that the mounting of the pivot bolt 8 within the set of slots 7 permits the wiper member to have inward and outward adjusting movements relative to the carrying arm and also to have pivotal movements so that it may accommodate itself to uneven surfaces in the glass. An opening 9 is provided through the back of the clip 6 and carrying arm of the holder in longitudinal register with each set of slots 7, and a screw 10 is adapted to be threaded through either opening 9 and into thrust contact at its inner end with the back of the wiper member 3 so that the adjusting thrust of the screw may be exerted against the wiper member in line with its pivot bolt 8 in either position of its adjustment longitudinally of the holder.

The other wiper member 4 of the device is carried by a U-shaped clip 11, which straddles the other arm of the holder 1 and may be rigidly secured thereto by rivets 12, or in any other suitable manner. The open side of the clip 11 is disposed inwardly with respect to the holder and receives the wiper member 4, which is preferably pivotally mounted therein by a screw 13 extending through any one of a series of openings 14 provided in longitudinally spaced relation in the clip and then extending into the wiper member 4 at or adjacent to its longitudinal center.

It is evident that both wiper members 3 and 4 are carried for limited pivotal movements relative to the holder 1, and that they may be adjusted longitudinally of the holder to suit the area of a windshield which it is desired to wipe; and also that the wiper member 3 may be adjusted toward and away from the wind-shield glass to vary the space between the wiping edges of the two wiping members, to suit the thickness of the glass or the pressure which it is desired to have the wiper members exert against opposed sides thereof, by merely adjusting the screws 10 in or out, as is apparent.

I wish it understood that my invention is not limited to any specific construction, arrangement or form of the parts, as it is capable of embodiment in numerous forms without departing from the spirit of the claims.

Having thus described my invention, what I claim as new, and desire to secure by Letters Patent, is,—

1. A windshield wiper, comprising a holder of U-form adapted to have its arms disposed at opposite sides of a windshield glass, a clip carried by one arm of the holder and having spaced sides projecting toward the other arm with opposed slots therein transverse to the arms, a wiper member mounted on the clip between the sides thereof, pivot means carried by the wiper member and extending into the slots of the clip sides to permit the wiper member to have pivotal movements relative to the clip, means threaded through the clip carrying arm in engagement with the back of the wiper member adjacent to its rocking axis and adjustable to shift the rocking axis longitudinally of the clip slots, and a second wiper carried by the other arm of the holder in opposed relation to the first wiper member.

2. A windshield wiper, comprising a U-shaped holder adapted to have its arms disposed at opposite sides of a windshield glass, a wiper member carried by each arm for adjustment longitudinally thereof and one member being mounted for rocking movements about a transverse axis and for inward and outward transverse adjusting movements relative to its carrying arm, and means carried by the carrying arm for the adjustable wiping member and adjustable to force the member inward a varying extent toward the other wiper member.

3. A windshield wiper comprising a U-shaped holder having its arms adapted to be disposed at opposite sides of a windshield glass and each arm having a wiper member carrying part projecting inward from its free end portion, one of said wiper member carrying parts having pivot receiving openings and spaced longitudinally of the respective holder arm, and the other of said parts having openings therein which are spaced lengthwise of the respective holder arm and are elongated transversely of such arm, a wiper member associated with each of said wiper member carrying parts, a pivotal member removably carried by each wiper member and to project selectively through any opening of the respective wiper member carrying part, and a screw adapted to be threaded selectively through perforations provided in one of the holder arms in longitudinal register with the transversely elongated opening of its wiper member carrying part and to exert an inward adjusting thrust against the back of the associated wiper member.

In testimony whereof I have hereunto set my hand to this specification.

PHILLIP SHERMAN.